No. 624,332. Patented May 2, 1899.
E. J. HICKS.
SAW JOINTER.
(Application filed Jan. 27, 1899.)
(No Model.)
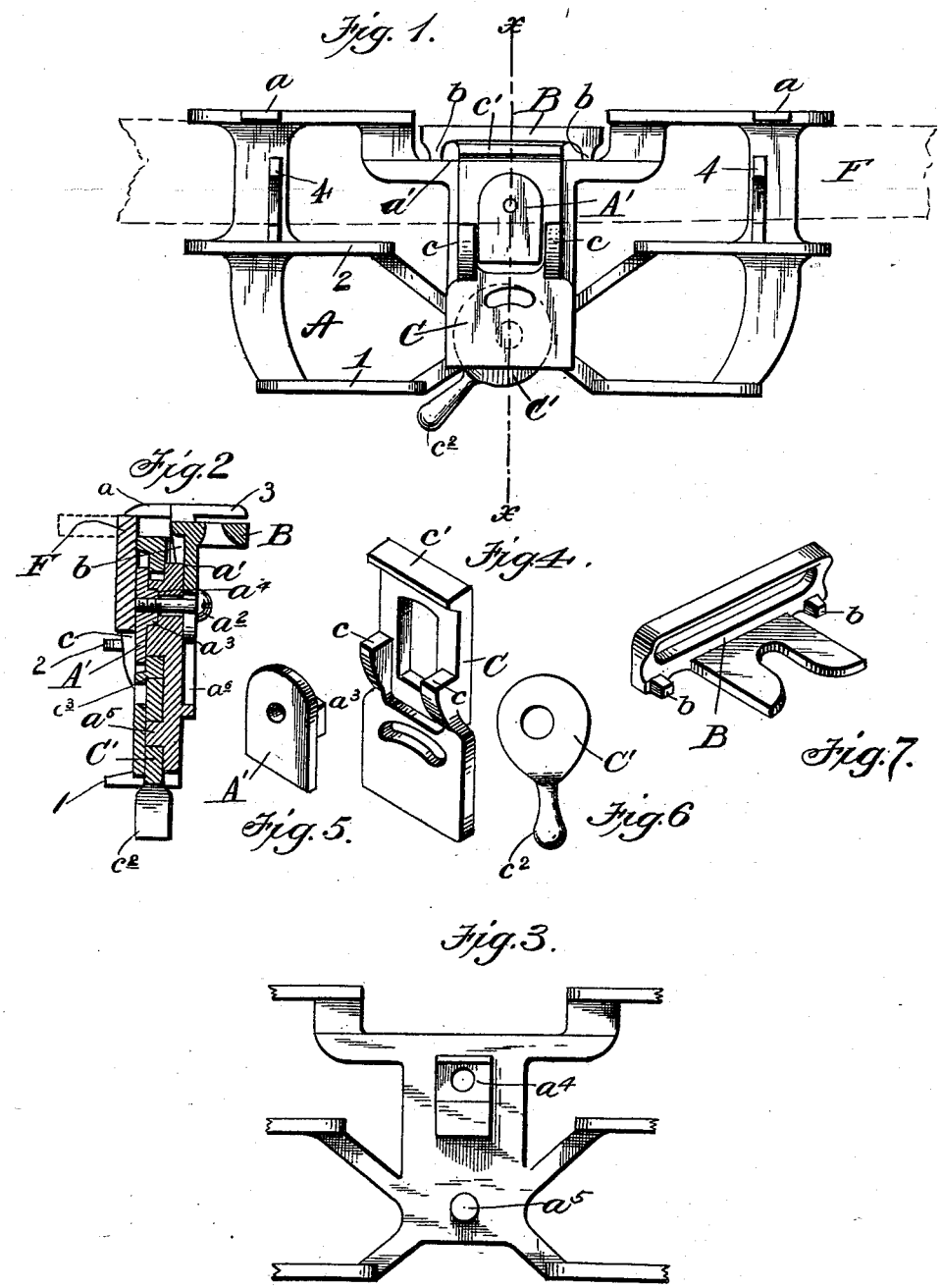

UNITED STATES PATENT OFFICE.

EDGAR J. HICKS, OF INDIANAPOLIS, INDIANA, ASSIGNOR OF ONE-HALF TO ROBERT E. POINDEXTER, OF SAME PLACE.

SAW-JOINTER.

SPECIFICATION forming part of Letters Patent No. 624,332, dated May 2, 1899.

Application filed January 27, 1899. Serial No. 703,592. (No model.)

*To all whom it may concern:*

Be it known that I, EDGAR J. HICKS, a citizen of the United States, residing at Indianapolis, in the county of Marion and State of Indiana, have invented certain new and useful Improvements in Saw-Jointers, of which the following is a specification.

My said invention consists in certain improvements in the details of construction and arrangement of parts of saw-jointers of that general construction such as is shown in patent to R. E. Poindexter, of February 16, 1897, No. 577,388, whereby a very convenient and perfect tool of the kind is provided, as will be hereinafter more fully described and claimed.

Referring to the accompanying drawings, which are made a part hereof and on which similar letters and figures of reference indicate similar parts, Figure 1 is a front elevation of a saw-jointer embodying my said improvements; Fig. 2, a transverse vertical section on the dotted line $xx$ in Fig. 1; Fig. 3, a view of the central portion of the base-block or frame with the clamp and other parts removed; Fig. 4, a perspective view of the clamping-plate; Fig. 5, a perspective view of the combined securing-nut and guide; Fig. 6, a similar view of the operating-cam, and Fig. 7 a perspective view of the gage-plate.

In said drawings the portions marked A represent the base-block or frame, B the gage-plate, and C the clamping-plate.

The base-block or frame A is of much the same general form as that of the Poindexter patent above referred to, consisting of a cast-metal skeleton with ribs 1 and 2 and projecting lugs $a$ and suitable seats for the file and various parts, arranged to secure lightness, strength, and convenience.

The gage-plate B is of the form shown in the patent before mentioned, except that projecting from its under face at each end in position to rest upon the floor $a'$ of the central recess in the frame provided to receive said plate are lugs $b$, formed somewhat cone-shaped. Said lugs are for the same purpose as the lugs $a^6$ in said Poindexter patent, providing for the ready leveling up of the plate by the dressing off of said lugs or points with a file, as required. The vertical shank of said plate is bifurcated and secured by the screw $a^2$, which projects through a suitably-located perforation in the frame and has a nut $A'$ upon its other end. Said nut $A'$ is of the form shown in Fig. 5, its outer portion being in the form of a plate with straight sides, which fits between side lugs on the clamping-plate and assists to guide it, as will be presently described. On the rear of said plate is a square lug $a^3$, which fits in a correspondingly-formed recess $a^4$ in a thickened portion of the frame around the perforation. Ways are thus formed on each side of said nut in which the clamping-plate may slide, while said screw $a^2$ is allowed to be drawn tightly down upon the shank of the gage-plate to secure it in place. Vertical flanges $a^6$ are also formed on the back of the frame, (see Fig. 2,) between which said gage-plate shank fits, and is thus given a more rigid and secure support.

The clamping-plate C is of the form shown most plainly in Fig. 4, having lugs on its sides the tops of which form clamping-jaws $c$, which engage the lower edge of the file when it is in position to joint the sides of the teeth, and with a ledge $c'$ at its top the face of which forms the lower jaw of the clamp to secure the file when adjusted to the position to joint the points of the teeth. Said first-named position of the file is shown in whole lines in Fig. 2, and the second position is indicated by dotted lines, and the file is indicated by the reference-letter F. Said clamping-plate is formed with an oblong aperture with straight sides adapted to fit over the square part $a^3$, the outer plate of the part $A'$ fitting between the lugs $c$ on the sides, and said plate being thus adapted to slide up and down, while being held firmly and steadily in position. The lower portion of said plate is cut away for a half or more of its thickness on its rear side, and a cam $C'$ is mounted in the recess thus formed on a pivot-lug $a^5$, formed on the frame A. Said cam is formed with an operating-lever $c^2$, and its operative face bears against the shoulder $c^3$ at the top of the recess in said plate C. (Shown in Fig. 2.) The turning of said cam on its pivot in one direction operates to force said plate C upward, while gravity permits it to fall when the cam is turned in the other direction, as will be readily understood.

In operation the parts are assembled by putting the clamping-plate C and operating-cam in place, then the part A', then the screw $a^2$, which is turned to the point where the shank of the plate B will readily slip behind its head, and said plate B is then put in place, having been previously properly adjusted, and said screw tightened to secure the parts rigidly. The cam is turned to permit the plate C to fall, when the file can be put in place. If it is desired to joint the sides of the teeth, it is put in the position shown in whole lines in Fig. 2, with its rear side resting against suitable bearing-points on the vertical ribs 4 near each end of the frame, its lower edge on the points $c$ on the clamping-plate, and its top edge under the points $a$ on the top of the frame. The cam C' being then turned, the file is tightly clamped between these parts and securely held. When it is desired to use the tool to joint the points of the teeth, the file is put in the position indicated by dotted lines in Fig. 2, between the top $c'$ of the clamping-plate and said points $a$ on the frame, and clamped in the same manner. By applying sufficient force to the cam the file can be slightly curved, if desired, as is sometimes the case in this operation, and by applying greater or less force greater or less curvature can be obtained, as will be readily understood.

Having thus fully described my said invention, what I claim as new, and desire to secure by Letters Patent, is—

1. In a saw-jointer, the combination, of the frame or base-block provided with suitable seats and bearings for the several parts, the clamping-plate provided on one side with two clamping points or jaws located one above the other and adapted to engage the file in its different positions, said file, and a cam for operating said clamping-plate mounted on a pivot on the frame in a recess under said clamping-plate, substantially as set forth.

2. The combination, in a saw-jointer, of the frame provided with suitable seats and bearing-points for the various parts, the part A' with the lug $a^3$ removably mounted on the front of said frame, the clamping-plate C formed with the points to engage the file in different positions and having an aperture which fits over said lug $a^3$ under the overhanging outer part, and the cam mounted on the pivot under the plate C, for operating it, substantially as set forth.

3. In a saw-jointer, the combination, of the frame formed with suitable rests and bearings for the various parts, the gage-plate mounted by means of a vertical shank in a recess on one side of said frame, the screw for securing it in place, the combined nut and guide A' on the opposite side of said frame seated in a suitable recess in the frame and engaging said screw, and formed with a wide outer plate which fits between side lugs on the clamping-plate, said clamping-plate mounted by means of an oblong aperture on said nut under said wide outer plate, and a cam mounted in a recess under said plate on a pivot on the frame, its operative face bearing against a shoulder on said clamping-plate, whereby it is adapted to operate it, all substantially as set forth.

In witness whereof I have hereunto set my hand and seal, at Indianapolis, Indiana, this 24th day of January, A. D. 1899.

EDGAR J. HICKS. [L. S.]

Witnesses:
HARRY E. DENISON,
GUY W. DUNNINGTON.